No. 719,608. PATENTED FEB. 3, 1903.
J. M. PETERSON.
AUTOMATIC BICYCLE BRUSH.
APPLICATION FILED SEPT. 2, 1902.
NO MODEL.
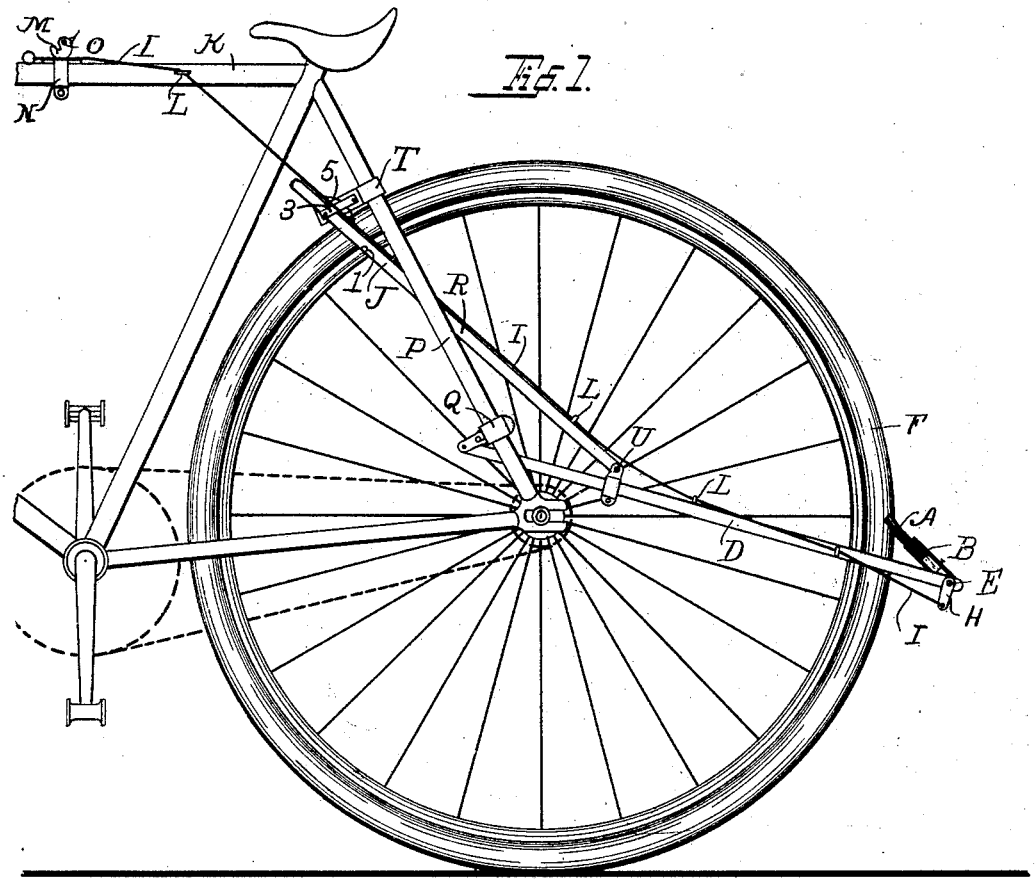
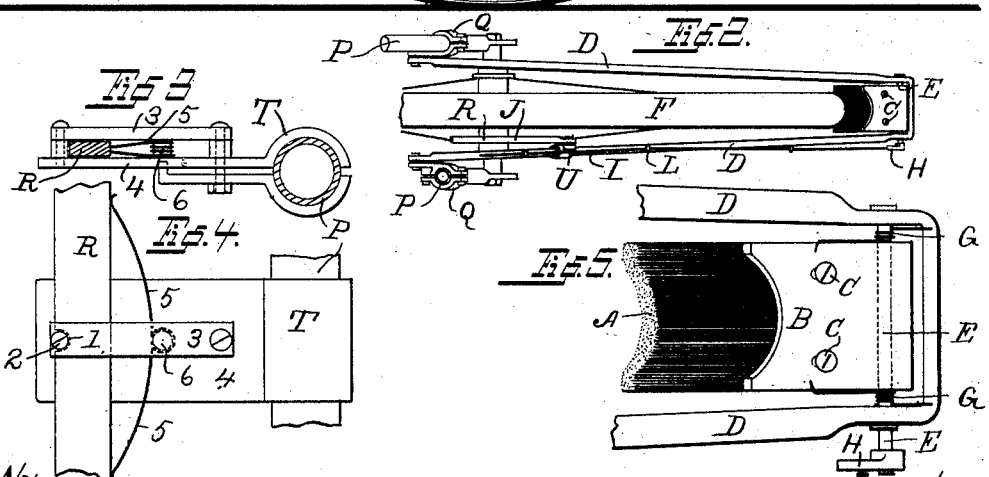
Witnesses. Inventor
John M. Peterson
By Erwin & Wheeler
Attorneys.
THE NORRIS PETERS CO., PHOTO-LITHO., WASHINGTON, D. C.

UNITED STATES PATENT OFFICE.

JOHN M. PETERSON, OF MILWAUKEE, WISCONSIN.

AUTOMATIC BICYCLE-BRUSH.

SPECIFICATION forming part of Letters Patent No. 719,608, dated February 3, 1903.

Application filed September 2, 1902. Serial No. 121,728. (No model.)

*To all whom it may concern:*

Be it known that I, JOHN M. PETERSON, a citizen of the United States, residing at Milwaukee, county of Milwaukee, and State of Wisconsin, have invented new and useful Improvements in Automatic Bicycle-Brushes, of which the following is a specification.

My invention relates to improvements in devices for brushing the mud and water from the rear wheel of a bicycle; and it pertains more especially to the means employed for adjustably supporting a brush or contact-bearing in rear of the rear wheel and also the means employed for throwing the brush or bearing into and out of contact with the tire of the wheel.

My invention is further explained by reference to the accompanying drawings, in which—

Figure 1 represents a side view thereof attached to the frame of a bicycle. Fig. 2 is a top view of the lower portion of the device. Fig. 3 is a detail view from the under side of the device for holding the upper end of the brush-supporting frame. Fig. 4 is a side view of the device shown in Fig. 3. Fig. 5 is a top view of the lower end of the brush-supporting frame and a brush therein.

Like parts are identified by the same reference characters throughout the several views.

The brush A is adjustably supported in the case B by the binding-screws C. The binding-screws C have screw-threaded bearings in the inclosing case and are adapted as they are turned down therein to impinge at their lower ends against the brush and retain the same in place at any desired point of adjustment, while they permit of the brush being adjusted forward from time to time as the same becomes worn by contact with the tire. The case B is pivotally supported from the respective sides of the supporting-frame D by the bolt E. The brush is held normally in contact with the tire F of the wheel by the recoil of the springs G G. The springs G are centrally supported from the bolt E, while one end thereof rests upon the frame D and their opposite ends bear beneath the brush-inclosing case B. One end of the brush-supporting bolt E is provided with an operating-arm H. The brush-inclosing case B is rigidly secured to the bolt E, whereby said brush is thrown in and out of contact with the tire by turning said bolt. Motion is communicated to the operating-arm H from the hand of the rider of the bicycle when sitting in his seat through the cord I. The cord I is supported from the frame D, operating-rod J, and the bar K of the bicycle through a series of staples or eyebolts L. It will be understood that when the cord I is slack the brush will be normally retained in contact with the tire, as stated.

When the condition of the streets is such as not to require the use of the brush, the same is thrown out of contact with the tire by drawing upwardly upon the cord I, when the cord is locked in such position by the eccentric bearing M. The eccentric bearing M is secured to the frame K by clamping-plates N and pivotal bolt O. It will be understood that the cord I is drawn between the eccentric bearing M and the clamping-plates N and is locked at any desired point of adjustment therein by turning down the eccentric bearing M against it. The brush-supporting frame D is pivotally supported at one end from the rear bars P P by the clamping-plates Q, while they are centrally supported from the upper end of said rear bars P P by the operating-bar R and rod-supporting bearings S. The operating-bar R is pivotally connected with the frame D by the clamping-plates T and pivotal bolts U and is adjustably connected at its upper end to the frame P by a plurality of recesses 1, which are adapted to engage upon the bolt 2, which bolt 2 is supported from said clamping-plates T by and between the bars 3 and 4.

When the brush is in position for use, as shown in Fig. 1, the bar R is adjusted so that the upper notch 1 will engage in said bolt 2, and thus support the brush in the desired position. When, however, the streets are in such a condition that it is not necessary to use the brush, said frame D is folded back beneath the seat by drawing upwardly upon the bar R until the lower end of the bar D is brought over and against the upper end of the bicycle-frame P, when said bolt 2 will engage in the lower notch 1 of said bar R. To provide for retaining the upper end of the bar R in contact with the bolt 2 and prevent said bolt from disengaging from said notches 1, I have interposed a spring 5 between said bar R and the bolt 6, whereby said bar R is pressed down by the recoil of said spring. The spring 5 is centrally supported from the bolt 6, while its ends bear against the opposing surface of said operating-bar R.

It will of course be understood that the tension of the springs G may be so arranged as to normally support said brushes A out of contact with the tire and that the same may be temporarily thrown into contact with the tire, as may be required from time to time when the rider is crossing a sprinkled street or a muddy portion of the street, by simply drawing upon the cord I, when by releasing said cord the brush will be automatically thrown out of contact with the tire again, and in this way the rider will be enabled without moving from his seat to control the action of the brush from time to time as occasion may require. When, however, the streets are in such a condition as not to require the occasional use of the brush, the brush and brush-supporting frame may be swung back beneath the seat of the rider, as hereinbefore described, by drawing upwardly upon the operating-rod R.

While I have shown an ordinary brush having flexible contact-bearings, it will be understood that a smooth non-flexible brush may be employed for removing the water or mud from the tire.

Having thus described my invention, what I claim as new, and desire to secure by Letters Patent, is—

1. In a brush-supporting device for bicycles, means for supporting the brush both in and out of contact with the tire of the wheel, means operative from the seat of the bicycle for adjusting the brush into and out of contact with the tire of the wheel, and means for folding the brush-supporting frame in the reverse position against the upper portion of the bicycle-frame beneath the seat as set forth.

2. In a brush-supporting device for bicycles, means for adjustably supporting the brush into and out of contact with the tire, means for operating said brush from the upper portion of the bicycle-frame, means for locking the brush into and out of contact with the tire, means for folding back said brush-supporting frame in a raised position beneath the seat of the rider, and means for locking and retaining said brush-supporting frame in its raised or folded position, all substantially as set forth.

In testimony whereof I affix my signature in the presence of two witnesses.

JOHN M. PETERSON.

Witnesses:
 JAS. B. ERWIN,
 LEVERETT C. WHEELER.